United States Patent
Noda et al.

(10) Patent No.: US 8,280,026 B2
(45) Date of Patent: Oct. 2, 2012

(54) LINKAGE APPARATUS, LINKAGE SYSTEM, AND COMPUTER PROGRAM

(75) Inventors: Masahide Noda, Kawasaki (JP); Ryuichi Matsukura, Kawasaki (JP); Satoshi Okuyama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 351 days.

(21) Appl. No.: 12/640,836

(22) Filed: Dec. 17, 2009

(65) Prior Publication Data
US 2010/0091980 A1    Apr. 15, 2010

Related U.S. Application Data

(63) Continuation of application No. PCT/JP2007/063907, filed on Jul. 12, 2007.

(51) Int. Cl.
*H04M 3/42*    (2006.01)
(52) U.S. Cl. .............................. 379/211.02; 379/212.01
(58) Field of Classification Search . 379/211.02–212.01
See application file for complete search history.

(56) References Cited

U.S. PATENT DOCUMENTS

| | | | |
|---|---|---|---|
| 5,343,526 A * | 8/1994 | Lassers | 705/59 |
| 5,440,620 A * | 8/1995 | Slusky | 379/100.07 |
| 5,999,611 A * | 12/1999 | Tatchell et al. | 379/211.02 |
| 6,094,478 A * | 7/2000 | Shepherd et al. | 379/211.02 |
| 6,285,750 B1 * | 9/2001 | Brachman et al. | 379/211.02 |
| 6,434,226 B1 | 8/2002 | Takahashi | |
| 6,571,108 B1 * | 5/2003 | Otsuka et al. | 455/433 |
| 6,798,767 B1 * | 9/2004 | Alexander et al. | 370/352 |
| 2002/0181398 A1 * | 12/2002 | Szlam | 370/230 |

FOREIGN PATENT DOCUMENTS

| | | |
|---|---|---|
| JP | A 10-240656 | 9/1998 |
| JP | A 10-327249 | 12/1998 |
| JP | A 2001-127906 | 5/2001 |
| JP | A 2001-186566 | 7/2001 |
| JP | 2005-236670 | 9/2005 |
| JP | 2008-177975 | 7/2008 |

OTHER PUBLICATIONS

Office Action issued by the Patent Office of Japan for JP 2009-522483 mailed Sep. 14, 2010 (with partial English language translation).

* cited by examiner

*Primary Examiner* — Simon Sing
(74) *Attorney, Agent, or Firm* — Greer, Burns & Crain, Ltd.

(57) ABSTRACT

There is provided a linkage apparatus for linking a plurality of telephones with one another, including a communication part communicating with the plurality of telephones, a detection part detecting operating states of the plurality of telephones, a determination part determining, on the basis of the detected operating states, whether or not the operating state of a first telephone out of the plurality of telephones has changed to a first state from a third state, and when it is determined that the operating state of the first telephone has changed, determining whether or not the operating state of a second telephone precedently set to be linked with the first telephone is a second state, and a decision part deciding a linkage process that the linkage apparatus makes the second telephone to execute when it is determined that the operating state of the second telephone is the second state.

17 Claims, 17 Drawing Sheets

F I G. 1
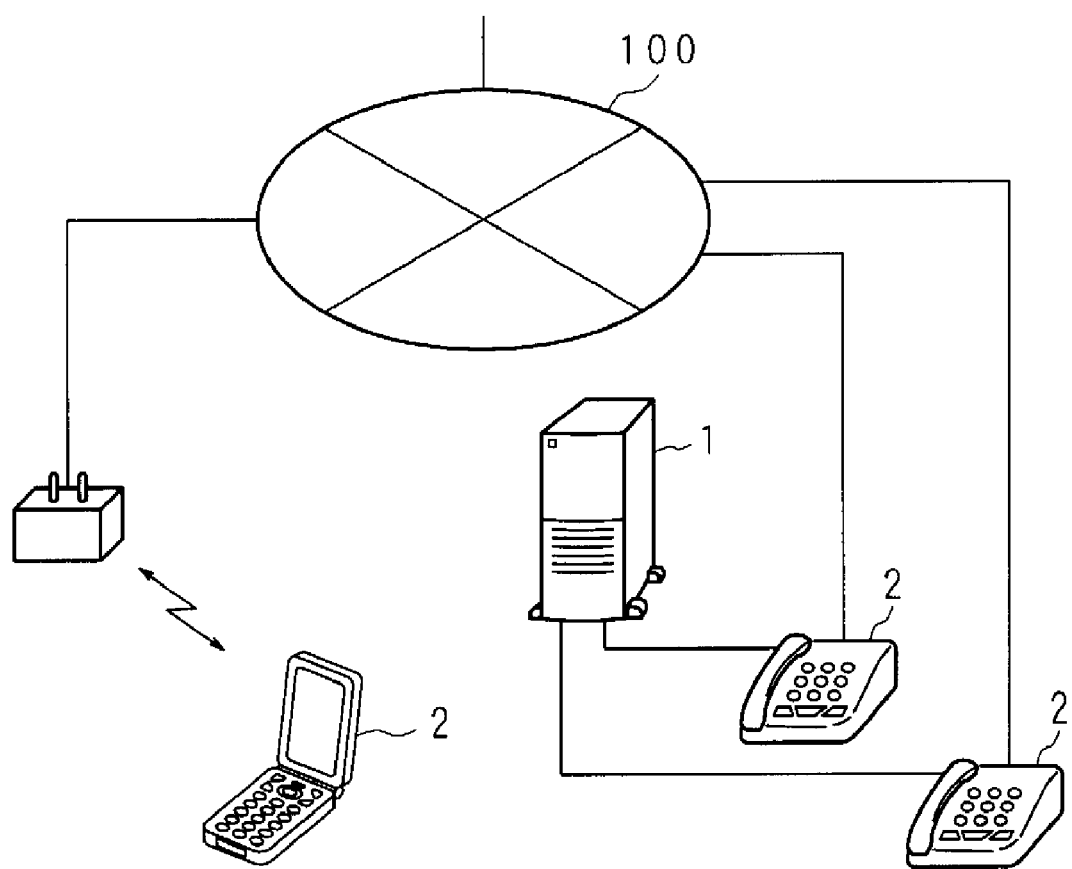

F I G. 3

| USER ID | TELEPHONE ID | STATE INFORMATION |
|---------|--------------|-------------------|
| ID00001 | 078-XXX-XXXX | INCOMING |
| ID00001 | 090-XXXX-XXXX | BUSY |
| ⋮ | ⋮ | ⋮ |

FIG. 4

| USER ID | FIRST STATE | SECOND STATE | LINKAGE PROCESS |
|---------|-------------|--------------|-----------------|
| ID00001 | INCOMING | BUSY | SUPERIMPOSING NOTIFYING SOUND OF INCOMING |
| ID00001 | ANSWERING | BUSY | HOLDING CALL |
| ID00001 | STANDBY | HOLDING | RELEASING HOLD |
| ID00001 | STANDBY (WITH VOICE MESSAGE) | BUSY | NOTIFYING BY SUPERIMPOSING VOICE MESSAGE |
| ... | ... | ... | ... |

F I G. 5
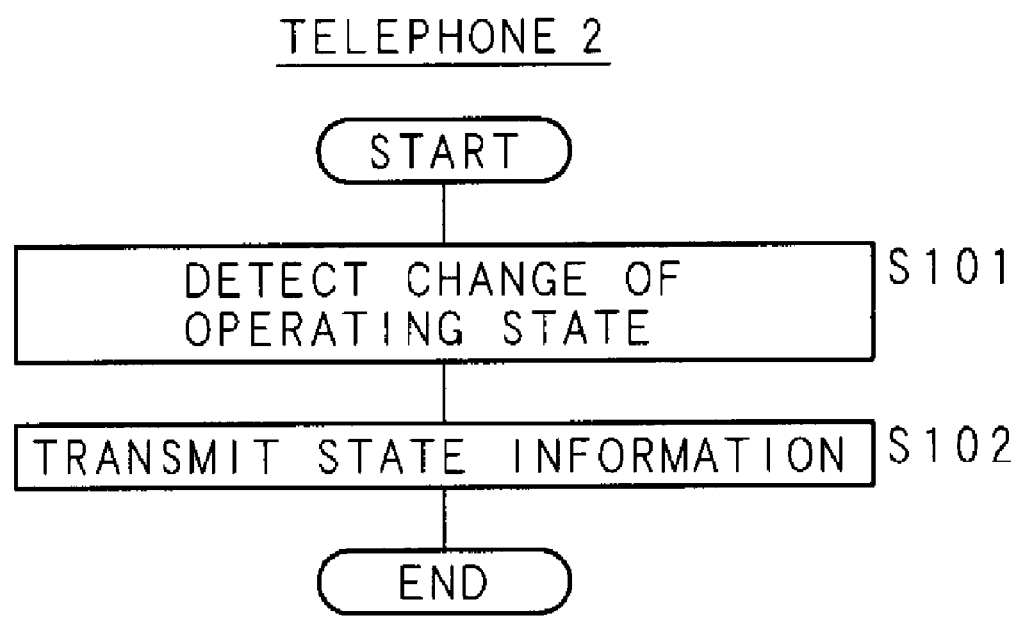

FIG. 8

| USER ID | FIRST STATE | SECOND STATE | | LINKAGE PROCESS |
|---|---|---|---|---|
| | | | TELEPHONE ID | |
| ID00001 | CALLING | STANDBY | 078-XXX-XXXX | BUSY RESPONSE MODE |
| ID00001 | CALLING | STANDBY | 090-XXXX-XXXX | SILENT MODE |
| ID00001 | CALLING | STANDBY | 090-ZZZZ-ZZZZ | SILENT MODE |
| ... | ... | ... | ... | ... |

FIG. 10

| USER ID | FIRST STATE | | SECOND STATE | LINKAGE PROCESS |
|---|---|---|---|---|
| | | PARTY TELEPHONE | | |
| ID00001 | CALLING | SATO | BUSY | SUPERIMPOSING NOTIFYING SOUND OF INCOMING |
| ID00001 | CALLING | SUZUKI | BUSY | RINGING |
| ID00001 | CALLING | UNKNOWN | BUSY | NO PROCESS |
| ID00001 | CALLING | THE REST | BUSY | NO PROCESS |
| ... | ... | ... | ... | ... |

FIG. 16

| USER ID | TELEPHONE ID | POSITION INFORMATION | STATE INFORMATION | LINKAGE FLAG |
|---|---|---|---|---|
| ID00001 | 090-XXXX-XXXX | BUSINESS PLACE B | STANDBY | 0 |
| ID00001 | 078-XXX-XXXX | BUSINESS PLACE A | STANDBY | 1 |
| ID00001 | 044-XXXX-XXXX | BUSINESS PLACE B | STANDBY | 1 |
| ID00001 | 06-XXXX-XXXX | HOME | STANDBY | 0 |
| ... | ... | ... | ... | ... | ively pointed out in the claims.
LINKAGE APPARATUS, LINKAGE SYSTEM, AND COMPUTER PROGRAM This application is a continuation, filed under 35 U.S.C. §111(a), of PCT International Application No. PCT/JP2007/063907 which has an international filing date of Jul. 12, 2007, and designated the United States of America.

FIELD

The embodiments discussed herein relate to a linkage apparatus for linking a plurality of telephones with one another, a linkage system including the linkage apparatus and a computer program for realizing the linkage apparatus, and more particularly, relate to a linkage apparatus, a linkage system and a computer program suitably employed when one user uses a plurality of telephones.

BACKGROUND

The telephone communication system has been widely spread nowadays, and there are increasing cases that one person uses a plurality of telephones. When one person uses a plurality of telephones, he/she should sometimes operate plural telephones at the same time. For example, in a situation where an extension telephone of an office and a cellular phone are both usable, if there is an incoming call on the cellular phone while a user is on the extension telephone, it is necessary for him/her to perform an operation of checking a caller by taking a look at the screen of the cellular phone for deciding whether he/she should answer the call. Furthermore, when he/she decides to answer the call on the cellular phone as a result of the check of the caller, it is necessary for him/her to perform an operation of answering the call on the cellular phone after performing an operation of putting the call on the extension telephone on hold.

Japanese Laid-Open Patent Publication No. H10 (1998)-240656 discusses an incoming call controlling method in which a user may check an incoming call on an extension telephone while operating a personal computer terminal by linking a private branch exchange with a server and informing the personal computer terminal of an incoming call on the extension telephone.

SUMMARY

In case where one user using a plurality of telephones is not assumed, reduction of complicated reactions and operations to be performed when one person uses a plurality of telephones and, for example, when there is an incoming call on one telephone while he/she is on another telephone as described above still remains as a problem to be solved.

There is provided a linkage apparatus for linking a plurality of telephones with one another, including: a communication part communicating with the plurality of telephones; a detection part detecting operating states of the plurality of telephones; a determination part determining, on the basis of the detected operating states, whether or not the operating state of a first telephone out of the plurality of telephones has changed to a first state from a third state, and when it is determined that the operating state of the first telephone has changed, determining whether or not the operating state of a second telephone precedently set to be linked with the first telephone is a second state; a decision part deciding a linkage process that the linkage apparatus makes the second telephone to execute when it is determined that the operating state of the second telephone is the second state; and a part issuing an instruction corresponding to the decided linkage process to the second telephone.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 1 is a diagram illustrating an exemplary architecture of a linkage system according to Embodiment 1;

FIG. 3 is a diagram illustrating exemplary recorded contents of a state table included in the linkage apparatus of Embodiment 1;

FIG. 4 is a diagram illustrating exemplary recorded contents of a process table included in the linkage apparatus of Embodiment 1;

FIG. 5 is an operation chart illustrating an exemplary state change informing process performed by the telephone included in the linkage system of Embodiment 1;

FIG. 8 is a diagram illustrating exemplary recorded contents of a process table included in a linkage apparatus according to Embodiment 2;

FIG. 10 is a diagram illustrating exemplary recorded contents of a process table included in a linkage apparatus according to Embodiment 3;

FIG. 16 is a diagram illustrating exemplary recorded contents of a state table included in a linkage apparatus according to Embodiment 6.

DESCRIPTION OF EMBODIMENTS

Figure 2:
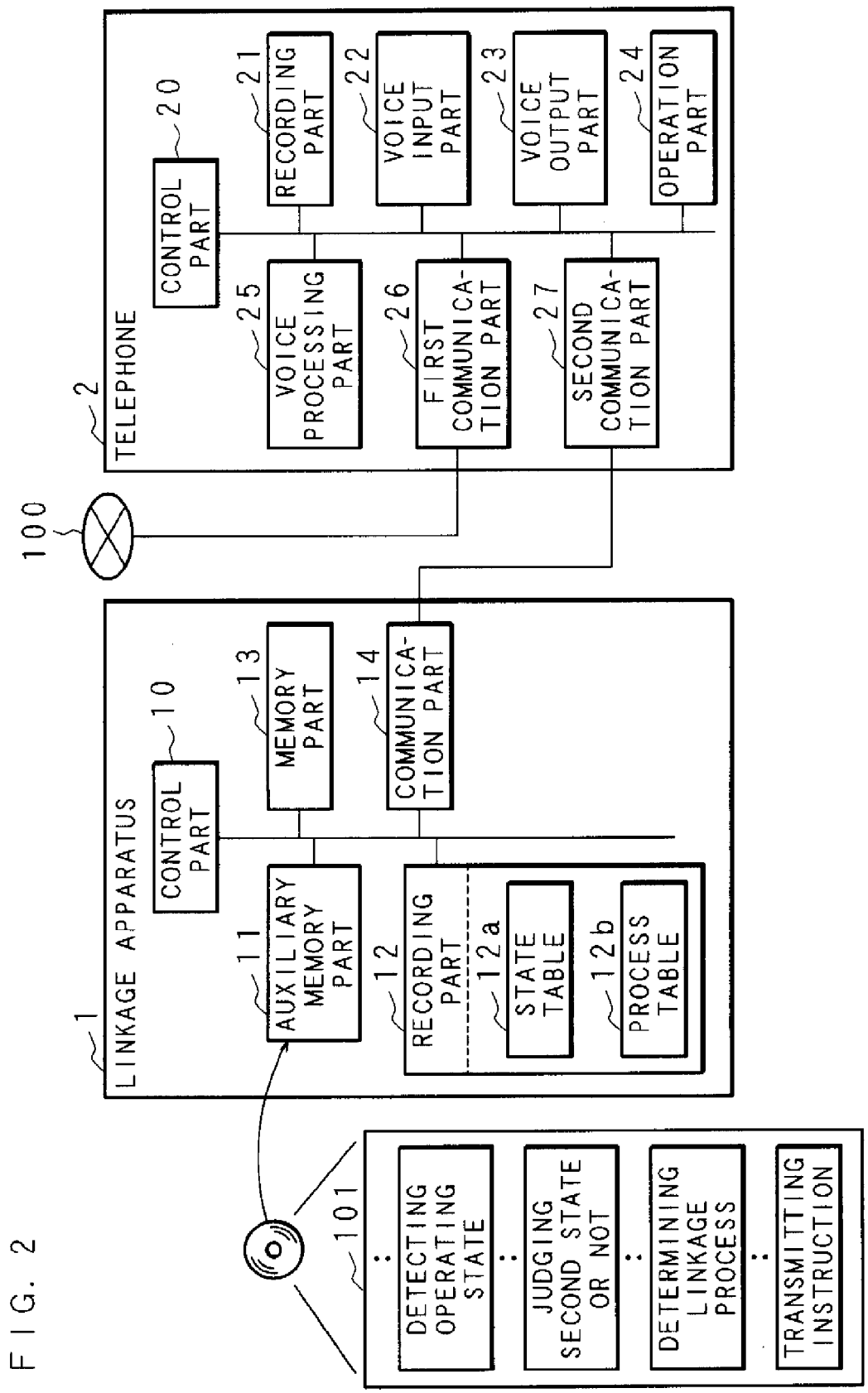
FIG. 2 is a block diagram illustrating exemplary configurations of a linkage apparatus and a telephone included in the linkage system of Embodiment 1.

Embodiments will be described in detail with reference to the accompanying drawings.

Embodiment 1

FIG. 1 is a diagram illustrating an exemplary architecture of a linkage system according to Embodiment 1. In FIG. 1, a reference numeral 1 denotes a linkage apparatus according to this embodiment using a computer such as a communication computer, and the linkage apparatus 1 is capable of radio or wired communication with telephones 2 such as a cellular phone and a fixed-line telephone. The communication between the linkage apparatus 1 and the telephones 2 may be performed through, for example, radio communication by employing communication according to any of various standards, for example, radio communication according to near field communication standards such as Bluetooth (registered trademark) or radio communication through the Internet Protocol (IP) network according to radio LAN standards such as IEEE802.11. Alternatively, the communication may be performed through wired communication by employing communication according to any of various standards such as wired communication through the IP network according to the standards of, for example, Ethernet (registered trademark) through the IP network and wired communication according to the standards of SCSI, USB2.0 or the like. The telephones 2 are connected to a telephone network 100, such as a public switched telephone network, an IP telephone network, a radio communication network or an internal telephone network, composed of various devises such as a radio base station, a call control device like an SIP server, any of various kinds of circuit switching devices and an internal PBX device, and may perform telephone communication with voice, namely, may be used for making/receiving a call.

FIG. 2 is a block diagram illustrating exemplary configurations of the linkage apparatus 1 and each telephone 2 included in the linkage system of Embodiment 1. The linkage apparatus 1 includes a control part 10 such as a CPU for controlling the entire apparatus; an auxiliary memory part 11 such as a CD-ROM drive for reading various kinds of information from a recording medium such as a CD-ROM where various kinds of information such as a computer program 101 of this embodiment and data are stored; a recording part 12 such as a hard disk for recording various information such as the computer program 101 of this embodiment read by the auxiliary memory part 11; and a memory part 13 such as a RAM for temporarily storing information. The computer program 101 of this embodiment recorded in the recording part 12 is stored in the memory part 13 to be executed under the control of the control part 10, so that the communication computer may operate as the linkage apparatus 1 of this embodiment. Furthermore, the linkage apparatus 1 includes a communication part 14 for wired or radio communicating with the telephones 2. The recording part 12 also records various kinds of information necessary for processes by using tables such as a state table 12a where state information corresponding to the operating state of each telephone 2 is stored and a process table 12b where the operating state and a linkage process to be instructed to each telephone 2 are stored.

Each telephone 2 includes a control part 20 such as CPU for controlling the entire telephone; a recording part 21 including volatile and nonvolatile memories for recording various kinds of information such as a program and data; a voice input part 22 such as a microphone for accepting a voice input; a voice output part 23 such as a loudspeaker for outputting voice; an operation part 24 including various buttons; a voice processing part 25 such as a voice chip for performing various voice processing; a first communication part 26 to be connected to the telephone network 100 such as an internal telephone network or a radio telephone network; and a second communication part 27 to be wired or radio connected to the linkage apparatus 1. Incidentally, when the operating state of the telephone 2 has changed, it transmits state information corresponding to the operating state attained after the change to the linkage apparatus 1, and when an instruction of a process is received from the linkage apparatus 1, the telephone 2 executes the process on the basis of the received instruction.

FIG. 3 is a diagram illustrating exemplary recorded contents of the state table 12a included in the linkage apparatus 1 of Embodiment 1. In the state table 12a, a telephone ID for specifying the telephone 2 and state information corresponding to the operating state of the telephone 2 are recorded in association with a user ID for specifying a user as a record. When a plurality of telephone IDs are associated with one user ID, it means that one user uses a plurality of telephones 2. A plurality of telephones 2 respectively specified by telephone IDs correspond to telephones 2 to be linked with one another, and when they are recorded in the state table 12a, the telephones 2 to be linked with one another may be precedently set. As a telephone ID, identification information such as a telephone number, an extension number or an IP address is used, and the linkage apparatus 1 may communicate with each telephone 2 on the basis of its telephone ID. An operating state corresponding to state information is a "calling" state corresponding to making a call, an "incoming" state corresponding to receiving an incoming call, an "answering" state corresponding to answering an incoming call, a "busy" state corresponding to a state where the telephone is available for a call after attaining call connection by answering the call, a "holding" state corresponding to a state where voice input/output is suppressed with call connection retained, a "disconnection" state corresponding to disconnection of call connection, or a "standby" state corresponding to a state where the telephone is capable of making a call or receiving an incoming call after disconnection.

FIG. 4 is a diagram illustrating exemplary recorded contents of the process table 12b included in the linkage apparatus 1 of Embodiment 1. In the process table 12b, data of respective items such as a user ID, a first state, a second state and a linkage process are recorded in association with one another as a record. The first state is state information corresponding to a state attained after the operating state of a first telephone 2 has changed. The second state is state information corresponding to a state of a second telephone 2 set to be linked with the first telephone 2 whose state has changed. The linkage process is a process to be executed by the second telephone 2 in linkage with the first telephone 2 whose state has changed. When the state of the first telephone 2 has changed to the first state and the second telephone 2 to be linked with the first telephone 2 is in the second state, the linkage apparatus 1 of this embodiment allows the second telephone 2 to execute the linkage process on the basis of the process table 12b.

Next, respective processes performed by the linkage apparatus 1 and the telephones 2 included in the linkage system of Embodiment 1 will be described. In FIG. 5, when each telephone 2 detects, under the control of the control part 20, that its own operating state has changed (at S101), it transmits state information corresponding to the operating state attained after the change from the second communication part 27 to the linkage apparatus 1 (at S102). For example, when a telephone 2 having been in the standby state receives an incoming call, its operating state changes from the "standby" state to the "incoming" state, and the telephone 2 transmits the state information corresponding to the "incoming" state to the linkage apparatus 1. It is noted that state information includes a telephone ID specifying a telephone 2 corresponding to the sender of the state information.

Figure 6:
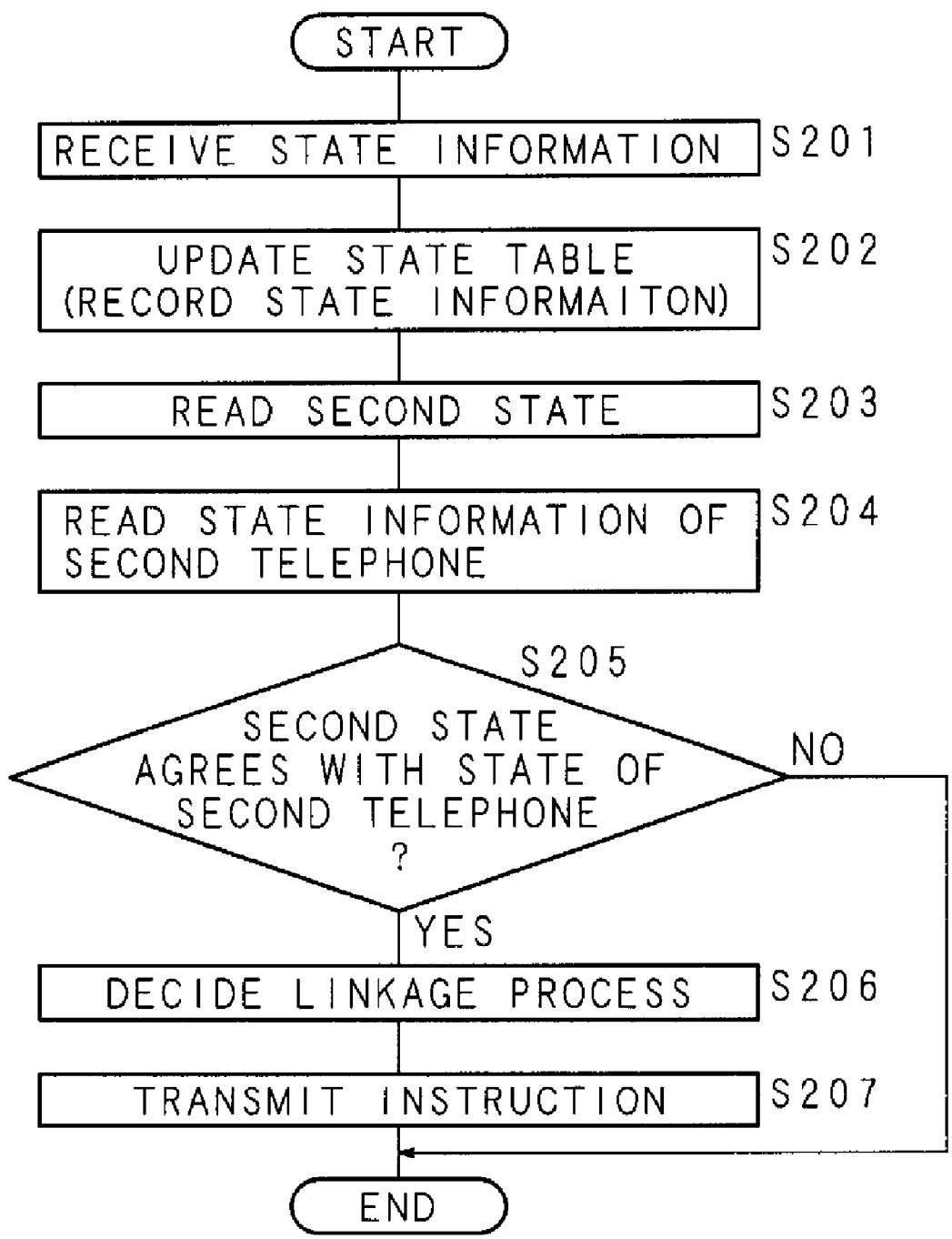
FIG. 6 is an operation chart illustrating an exemplary linkage necessity determining process performed by the linkage apparatus included in the linkage system of Embodiment 1.

In FIG. 6, a process performed by the linkage apparatus 1 having received the state information sent through the aforementioned state change informing process performed by the telephone 2 will be described as a linkage necessity determining process. The linkage apparatus 1 receives the state information at the communication part 14 under the control of the control part 10 executing the computer program 101 stored in the memory part 13 (at S201), and updates the state table 12a on the basis of the received state information (namely, records the received state information in the state table 12a) (at S202). In the operation S202, the operating state corresponding to the received state information is recorded in the item of the state information associated with the telephone ID specifying the sender telephone 2 included in the received state information.

After updating the state information, under the control of the control part 10, the linkage apparatus 1 retrieves records corresponding to a user ID associated with the updated operating state from the process table 12b, further retrieves a record including the updated operating state according with the first state from the retrieved records, and reads a second state recorded in the retrieved record from the process table 12b (at S203). In the operation S203, when the process table 12b of FIG. 4 is used for example, the linkage apparatus 1 extracts a record on the first row and reads the second state of the "busy" state associated with the first state of the "incoming" state. Incidentally, when a record according with the retrieval condition is not recorded in the process table 12b, the linkage apparatus 1 determines that it is state change unnecessary to be linked with and terminates the linkage necessity determining process without executing processing thereafter.

Under the control of the control part 10, the linkage apparatus 1 reads, on the basis of the state table 12a, the state information of a second telephone 2 to be linked with the first telephone 2 corresponding to the sender of the state information (at S204). In the operation S204, among a plurality of telephone IDs recorded in association with the same user ID, the state information associated with telephone IDs other than the telephone ID of the telephone 2 corresponding to the sender of the state information are read.

Under the control of the control part 10, the linkage apparatus 1 determines whether or not the second state read in the operation S203 accords with the state corresponding to the state information read in the operation S204 (at S205). In the operation S205, it is determined whether or not the operating state of the second telephone 2 precedently set to be linked with the first telephone 2 accords with the read second state.

When it is determined in the operation S205 that the states accord with each other (namely, YES at S205), the linkage apparatus 1 decides, under the control of the control part 10, a linkage process recorded in the process table 12b in association with the second state read in the operation S203 as the linkage process to be executed by the second telephone 2 whose operating state accords with the second state (at S206). In the operation S206, when the process table 12b of FIG. 4 is used for example, the linkage apparatus 1 decides, on the basis of the record recorded on the first row, the linkage process to be executed by the second telephone 2 in the "busy" state as "incoming call informing tone superposition". The "incoming call informing tone superposition" is a process for outputting a tone such as a given electronic tone or voice guidance superposed on a conversation tone.

Then, the linkage apparatus 1 issues, under the control of the control part 10, an instruction corresponding to the decided linkage process from the communication part 14 to the second telephone 2 so as to make the second telephone 2 execute the decided linkage process (at S207).

When it is determined in the operation S205 that the states do not accord with each other (namely, NO at S205), the linkage necessity determining process is terminated without executing processing in and after the operation S206.

Figure 7:
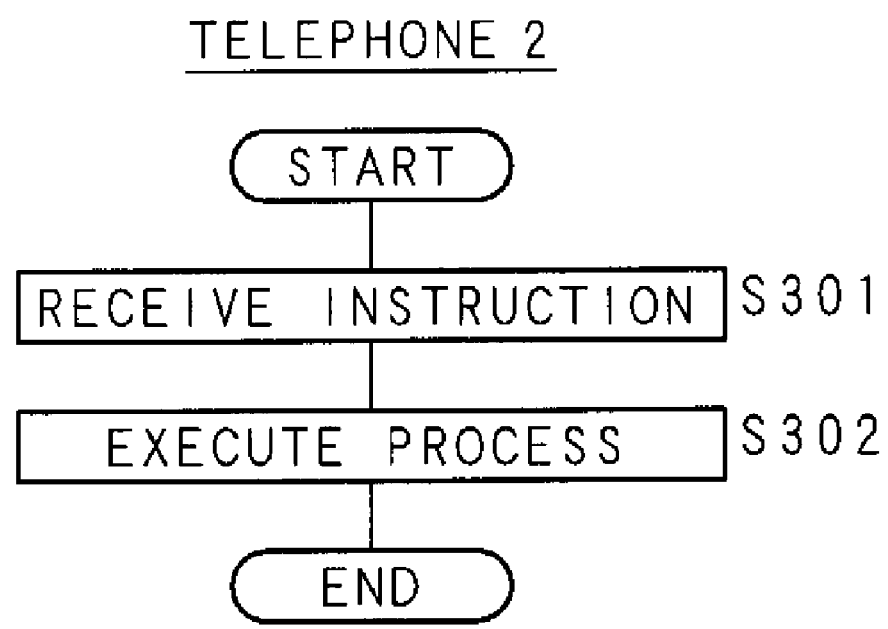
FIG. 7 is an operation chart illustrating an exemplary instruction executing process performed by the telephone included in the linkage system of Embodiment 1.

In FIG. 7, a process performed by the telephone 2 having received the instruction corresponding to the linkage process issued through the linkage necessity determining process performed by the linkage apparatus 1 will be described as an instruction executing process. Under the control of the control part 20, the telephone 2 receives the instruction corresponding to the linkage process at the second communication part 27 (at S301), and executes the process on the basis of the received instruction (at S302). In the operation S302, when the process table 12b of FIG. 4 is used for example and the "incoming call informing tone superposition" is to be executed on the basis of the record recorded on the first row, the telephone 2 superposes a tone such as a given electronic tone or voice guidance on a conversation tone such as voice of a person at the other end received from the telephone network 100 by the first communication part 26, and outputs the conversation tone on which the given tone has been superposed from the voice output part 23. The given tone to be superposed may be precedently recorded on the side of the telephone 2 or tone information may be recorded in the process table 12b of the linkage apparatus 1 in association with the linkage process so as to be transmitted from the linkage apparatus 1 to the telephone 2 in addition to the instruction. When an electronic tone is to be superposed, the tone may be generated by the telephone 2 on the basis of an instruction. A voice guidance is, for example, voice of "There is an incoming call on the extension." or the like. Furthermore, a mixing function of the voice processing part 25 included in the telephone 2 is used for the superposition of the tone.

Through the state change informing process, the linkage necessity determining process and the instruction executing process described with reference to FIGS. 5 through 7, when there is an incoming call on a telephone 2 of a cellular phone while a user is on another telephone 2 of a fixed-line telephone, a given tone of "There is an incoming call on the cellular phone." or the like is output from the telephone 2 of the fixed-line telephone.

Furthermore, when the user realizes the incoming call owing to the operation for outputting the given tone and performs an operation to answer the telephone 2 having received the incoming call by, for example, taking up the receiver or pressing an answer button, the operating state of the telephone 2 having received the incoming call is changed from the "incoming" state to the "answering" state, and hence, the state change informing process is executed, so as to inform the linkage apparatus 1 of the state change of the telephone 2.

When the linkage apparatus 1 receives the state information that the state of the telephone 2 has changed from the "incoming" state to the "answering" state, it updates the state table 12a as the processing corresponding to the operation S202 of the linkage necessity determining process, reads the second state, that is, the "busy" state at this point, from the process table 12b as the processing corresponding to the operation S203, and reads the state information of the second telephone 2, that is, the fixed-line telephone at this point, from the state table 12*a* as the processing corresponding to the operation S204. Then, the linkage apparatus 1 determines whether or not the second state accords with the state corresponding to the state information of the second telephone 2 as the processing corresponding to the operation S205, and when it is determined that the states accord with each other, the linkage apparatus 1 decides the linkage process on the basis of the processing table 12*b* as the processing corresponding to the operation S206 and issues an instruction corresponding to the decided linkage process as the processing corresponding to the operation S207.

The process performed in this case corresponds to a record recoded on the second row of the process table 12*b* of FIG. 4. In the record recorded on the second row of the process table 12*b* of FIG. 4, the first state is the "answering" state, the second state is the "busy" state and the linkage process is "call holding". In accordance with the setting of the record recorded on the second row of the process table 12*b*, when the operating state of the telephone 2 having received the incoming call is changed from the "incoming" state to the "answering" state, the linkage apparatus 1 issues an instruction corresponding to "call holding" to the telephone 2 in the busy state, and hence, the telephone 2 having received the instruction executes a process for holding the call. Specifically, when a user answers an incoming call on a cellular phone while on a fixed-line telephone, the fixed-line telephone is automatically put on hold. Incidentally, the telephone 2 thus held may allowed to request a person at the other end for a voice message.

A process to be performed for a record recorded on the third row of the process table 12*b* of FIG. 4 will now be described. In the record of the third row, the first state is the "standby" state, the second state is the "holding" state and the linkage process is "hold releasing". This record is obtained when the user disconnects the call connection of the cellular phone so as to shift the cellular phone to the "standby" state after answering the incoming call on the cellular phone and holding the call on the fixed-line telephone through the process for the record on the second row.

When the linkage apparatus 1 receives the state information that the state of the first telephone 2, that is, the cellular phone at this point, has changed to the "standby" state, it updates the state table 12*a* as the processing corresponding to the operation S202 of the linkage necessity determining process, reads the second state, that is, the "call holding" at this point, from the process table 12*b* as the processing corresponding to the operation S203, and reads the state information of the second telephone 2, that is, the fixed-line telephone at this point, from the state table 12*a* as the processing corresponding to the operation S204. Then, the linkage apparatus 1 determines whether or not the second state accords with the state corresponding to the state information of the second telephone 2 as the processing corresponding to the operation S205, and when it is determined that the states accord with each other, the linkage apparatus 1 decides a linkage process on the basis of the process table 12*b* as the processing corresponding to the operation S206 and issues an instruction corresponding to the decided linkage process, that is, "hold releasing" in this case, as the processing corresponding to the operation S207.

In this manner, as the process on the basis of the record on the third row of the process table 12*b* of FIG. 4, when the user disconnects the call connection of the cellular phone, the linkage apparatus 1 releases the hold of the fixed-line telephone so as to place it in an available state.

A process to be performed for a record recorded on the fourth row of the process table 12*b* of FIG. 4 will now be described. In the record of the fourth row, the first state is the "standby (with a voice message)" state, the second state is the "busy" state and the linkage process is "voice message superposed informing". This record is obtained when the person at the other end of the fixed-line telephone has recorded a voice message in the fixed-line telephone and disconnected the call connection with the fixed-line telephone so as to shift the fixed-line telephone to the "standby" state after the user answered the incoming call on the cellular phone and the call on the fixed-line telephone was put on hold through the process for the record of the second row.

When the linkage apparatus 1 receives the state information that the state of the first telephone 2, that is, the fixed-line telephone at this point, has changed to the "standby (with a voice message)" state, it updates the state table 12*a* as the processing corresponding to the operation S202 of the linkage necessity determining process, reads the second state, that is, the "busy" state at this point, from the process table 12*b* as the processing corresponding to the operation S203, and reads the state information of the second telephone 2, that is, the cellular phone at this point, from the state table 12*a* as the processing corresponding to the operation S204. Then, the linkage apparatus 1 determines whether or not the second state accords with the state corresponding to the state information of the second telephone 2 as the processing corresponding to the operation S205, and when it is determined that the states accord with each other, the linkage apparatus 1 decides a linkage process on the basis of the process table 12*b* as the processing corresponding to the operation S206, and issues an instruction corresponding to the decided linkage process, that is, "voice message superposed informing" in this case, as the processing corresponding to the operation S207. The voice message is, however, recorded in the first telephone 2 of the fixed-line telephone, and therefore, the linkage apparatus 1 first requests the first telephone 2 to transmit the recorded voice message, and after receiving the voice message from the first telephone 2, it adds the received voice message to the instruction corresponding to "voice message superposed informing" to be issued to the second telephone 2 of the cellular phone. Then, the second telephone 2 superposes the received voice message on a conversation tone such as voice of a person at the other end and outputs the superposed tone from the voice output part 23.

In this manner, as the processing on the basis of the record recorded on the fourth row of the process table 12*b* of FIG. 4, when a person at the other end of the fixed-line telephone has disconnected the call connection after recording a voice message, the linkage apparatus 1 superposes the voice message on a conversation tone of the cellular phone to be output.

Although one user uses a plurality of telephones in Embodiment 1, the embodiment is not limited to this but may be developed to an embodiment where a plurality of telephones, such as a plurality of grouped telephones or a plurality of telephones including one telephone provided with a switchboard number, are used by a plurality of users. Thus, the embodiment may be developed to various embodiments including an embodiment where when there is an incoming call while one user is on one telephone, another telephone close to another user is rung.

Embodiment 2

In Embodiment 2, the process table of Embodiment 1 is provided with an item of a telephone ID. The exemplary architecture of a linkage system according to Embodiment 2 is substantially the same as that of Embodiment 1 and hence the description is herein omitted by referring to the description of Embodiment 1. Also, the exemplary configurations of a linkage apparatus and each telephone included in the linkage system of Embodiment 2 are substantially the same as those of Embodiment 1 and hence the description is herein omitted by referring to the description of Embodiment 1. It is noted that like reference numerals are used in the following description to refer to like elements used in Embodiment 1.

FIG. 8 is a diagram illustrating exemplary recorded contents of a process table 12b included in the linkage apparatus 1 of Embodiment 2. In the process table 12b, data of respective items such as a user ID, a first state, a second state, a telephone ID and a linkage process is recorded in association with one another as a record. The user ID, the first state, the second state and the linkage process are substantially the same as those of Embodiment 1. The telephone ID is data associated with the second state, and the associated linkage process is performed merely when a second telephone 2 to be linked with is a telephone 2 specified by the telephone ID. For example, in the exemplary case illustrated in FIG. 8, although the first state and the second state are the same, the linkage process corresponding to a telephone ID of "078-xxx-xxxx" is a "busy response mode" and the linkage process corresponding to a telephone ID of "090-xxxx-xxxx" is a "silent mode".

Respective processes performed by the linkage apparatus 1 and each telephone 2 included in the linkage system of Embodiment 2 will now be described. A state change informing process performed by the telephone 2 of Embodiment 2 is substantially the same as that of Embodiment 1 and hence the description is herein omitted by referring to the description of Embodiment 1. In Embodiment 2, however, it is assumed that a calling operation is performed by using a telephone 2 with a telephone ID of "090-ZZZZ-ZZZZ" and that state information corresponding to the "calling" state is transmitted from the telephone 2 to the linkage apparatus 1.

Figure 9:
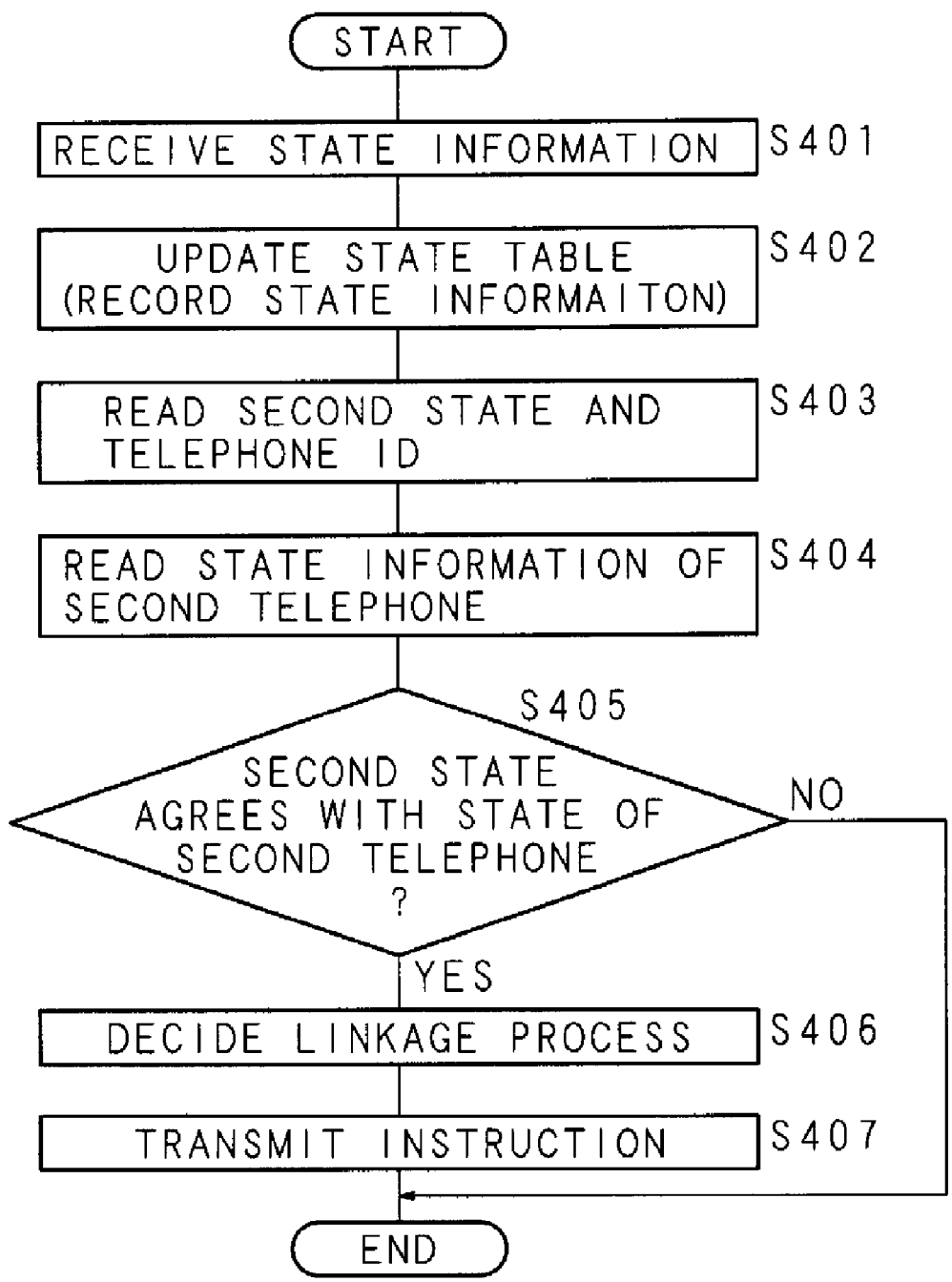
FIG. 9 is an operation chart illustrating an exemplary linkage necessity determining process performed by the linkage apparatus included in a linkage system according to Embodiment 2.

FIG. 9 is an operation chart illustrating an exemplary linkage necessity determining process performed by the linkage apparatus 1 included in the linkage system of Embodiment 2. The linkage apparatus 1 receives the state information at the communication part 14 under the control of the control part 10 executing the computer program 101 stored in the memory part 13 (at S401), and updates the state table 12a on the basis of the received state information (namely, records the received state information in the state table 12a) (at S402).

After updating the state information, under the control of the control part 10, the linkage apparatus 1 retrieves records corresponding to a user ID associated with the updated operating state from the process table 12b, retrieves a record having the updated operating state according with the first state from the retrieved records, and reads a combination of the second state and the telephone ID recorded in the retrieved record from the process table 12b (at S403). In the operation S403, when the process table 12b of FIG. 8 is used for example, the linkage apparatus 1 extracts records recorded on the first and second rows, and reads a combination of the second state of the "standby" state and the telephone ID of "078-xxx-xxxx" and a combination of the second state of the "standby" state and the telephone ID of "090-xxxx-xxxx" associated with the first state of the "calling" state. A telephone 2 corresponding to a record on the third row is the first telephone 2 in the "calling" state that is used for the calling operation, and therefore, the data of this telephone 2 is not read at this point.

Under the control of the control part 10, the linkage apparatus 1 reads, on the basis of the state table 12a, the state information of a second telephone 2 to be linked with the first telephone 2 corresponding to the sender of the state information (at S404). In the operation S404, the state information associated with each telephone ID read in the operation S403 is read.

Under the control of the control part 10, the linkage apparatus 1 determines whether or not the second state read in the operation S403 accords with the state corresponding to the state information read in the operation S404 (at S405). When there are a plurality of telephones 2 as targets for the determination as illustrated in FIG. 8, the determination for the state information is made with respect to each of the plural telephones 2. Incidentally, when there are a plurality of telephones as targets of the processing, processing performed in and after the operation S405 is executed on each of the plural telephones 2.

When it is determined in the operation S405 that the states accord with each other (namely, YES at S405), the linkage apparatus 1 decides, under the control of the control part 10, a linkage process recorded in the process table 12b in association with the second state read in the operation S403 as the linkage process to be executed by the second telephone 2 whose operating state accords with the second state (at S406).

Then, the linkage apparatus 1 issues, under the control of the control part 10, an instruction corresponding to the decided linkage process from the communication part 14 to the second telephone 2 so as to allow the second telephone 2 to execute the decided linkage process (at S407).

When it is determined in the operation S405 that the states do not accord with each other (namely, NO at S405), the linkage necessity determining process is terminated without executing the processing in and after the operation S406.

An instruction executing process performed by the telephone 2 of Embodiment 2 is substantially the same as that of Embodiment 1 and hence the description is herein omitted by referring to the description of Embodiment 1.

Through the state change informing process, the linkage necessity determining process and the instruction executing process exemplarily described above, when one of, for example, three telephones 2 to be linked with one another is used for calling, one of the other telephones 2 is shifted to the busy response mode, that is, what is called a busy mode, and the other is shifted to the silent mode.

Although a telephone ID is recorded in the process table in Embodiment 2, the embodiment is not limited to this but may be developed to various embodiments including an embodiment where information corresponding to the kind of telephone such as a cellular phone or a fixed-line telephone is recorded so as to allow one or a plurality of telephones of the same kind to perform the same linkage process.

Furthermore, although the second state and the telephone ID are associated with each other in Embodiment 2, this embodiment may be developed to various embodiments including an embodiment where the first state and the telephone ID are associated with each other.

Embodiment 3

In Embodiment 3, the process table of Embodiment 1 is provided with an item of information corresponding to a party telephone of a telephone call. The exemplary architecture of a linkage system according to Embodiment 3 is substantially the same as that of Embodiment 1 and hence the description is herein omitted by referring to the description of Embodiment 1. Also, the exemplary configurations of a linkage apparatus and each telephone included in the linkage system of Embodiment 3 are substantially the same as those of Embodiment 1 and hence the description is herein omitted by referring to the description of Embodiment 1. It is noted that like reference numerals are used in the following description to refer to like elements used in Embodiment 1.

FIG. 10 is a diagram illustrating exemplary recorded contents of a process table 12b included in the linkage apparatus 1 of Embodiment 3. In the process table 12b, data of respective items such as a user ID, a first state, a party telephone, a second state and a linkage process is recorded in association with one another as a record. The user ID, the first state, the second state and the linkage process are substantially the same as those of Embodiment 1. The party telephone is data associated with the first state and corresponds to a telephone party to a call with the first telephone 2, namely, a telephone 2 corresponding to a caller or a receiver of the call, and various kinds of party telephone information such as a telephone number and a name of a person, a company or the like of the party telephone is recorded in this item. Incidentally, when the linkage apparatus 1 is equipped with telephone directory data in which a telephone number and a name of a person and/or a company are recorded in association with each other, the kinds of party telephone information may be mutually converted. When the party telephone information is thus recorded, the associated linkage process is performed merely when the first state accords with the state of a call with a party specified by the party telephone. For example, in the exemplary case of FIG. 10, although the first state and the second state are the same, the linkage process corresponding to a party telephone of "Sato" is "incoming call informing tone superposition", and the linkage process corresponding to a party telephone of "Suzuki" is "telephone ring". It is noted that a party telephone of "unknown" means an incoming call with the number of the party telephone withheld. Also, "the rest" means a party telephone whose information is not recorded in the process table 12b, and corresponds to a party telephone other than "Sato", "Suzuki" and "unknown" in this case.

Figure 11:
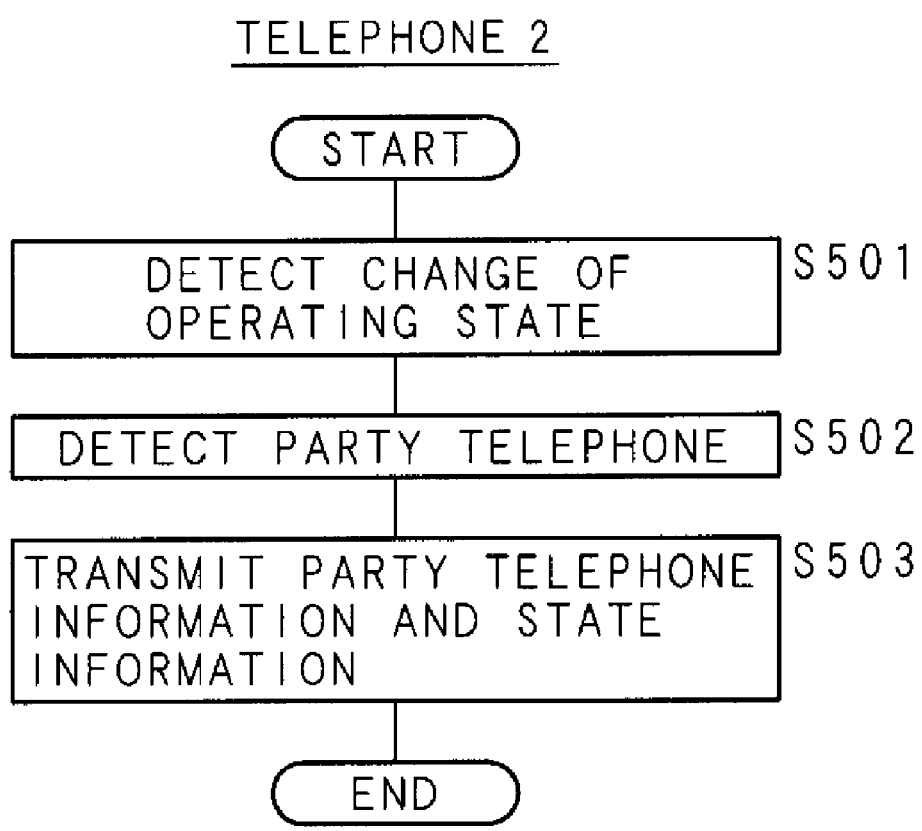
FIG. 11 is an operation chart illustrating an exemplary state change informing process performed by a telephone included in a linkage system of Embodiment 3.

Respective processes performed by the linkage apparatus 1 and each telephone 2 included in the linkage system of Embodiment 3 will now be described. FIG. 11 is an operation chart illustrating an exemplary state change informing process performed by the telephone 2 included in the linkage system of Embodiment 3. When the telephone 2 detects, under the control of the control part 20, that its own operating state has changed to the calling or incoming state (at S501), it detects a party telephone (at S502). In the operation S502, with respect to an incoming call, the telephone 2 detects the telephone number of the party telephone by using, for example, its telephone number detecting function. Furthermore, when the detected telephone number is recorded in the recording part 21 as the telephone directory data associated with name information of a name of a person or a company, the telephone 2 reads the name information associated with the detected telephone number. Alternatively, in making a call, the telephone 2 detects a telephone number input by a user, and when the telephone number is recorded in association with name information, it reads the name information.

Then, the telephone 2 transmits the detected telephone number of the party telephone, party telephone information such as the name information and state information corresponding to the operating state attained after the change from the second communication part 27 to the linkage apparatus 1 (at S503).

Figure 12:
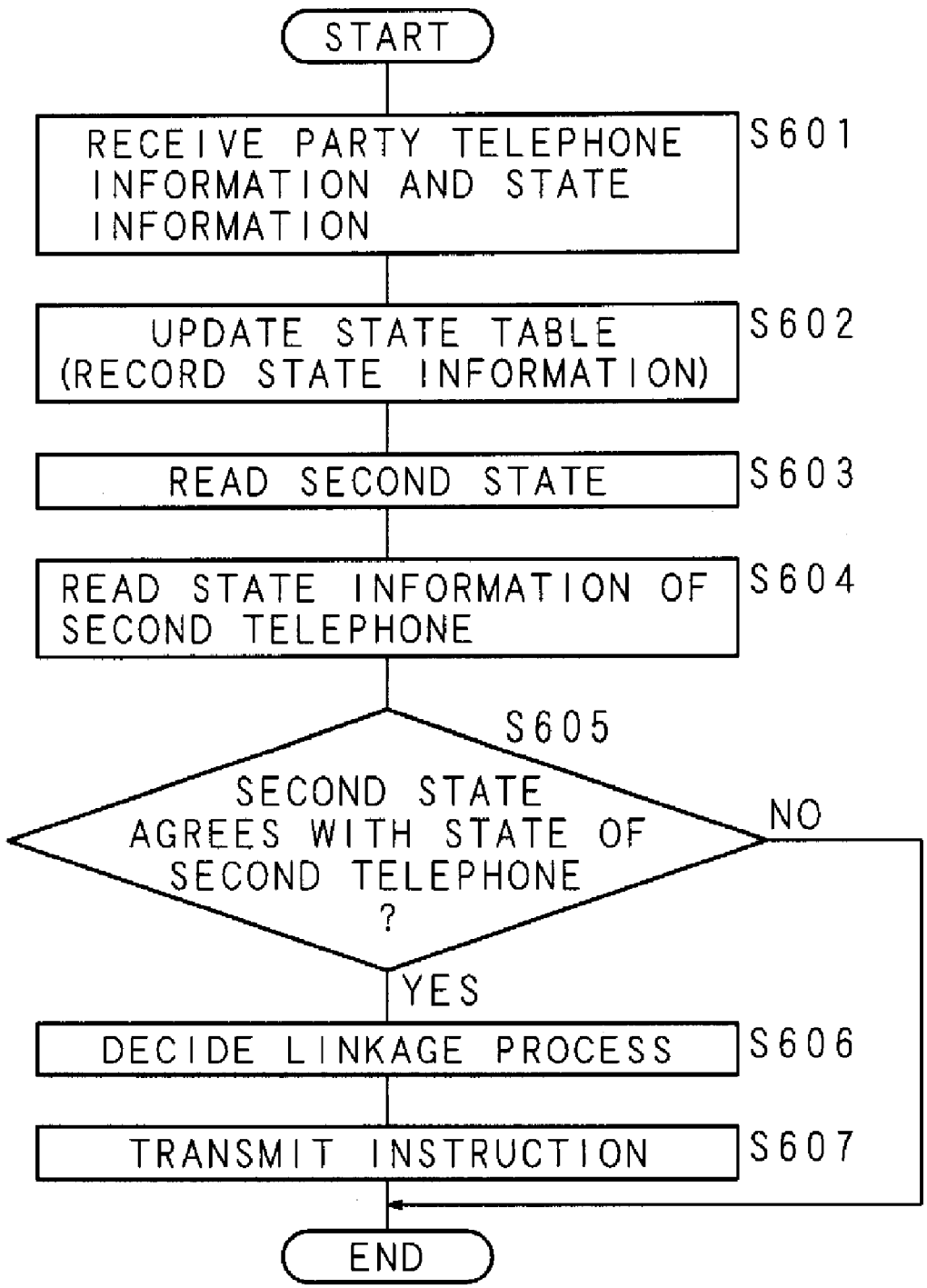
FIG. 12 is an operation chart illustrating an exemplary linkage necessity determining process performed by the linkage apparatus included in the linkage system of Embodiment 3.

FIG. 12 is an operation chart illustrating an exemplary linkage necessity determining process performed by the linkage apparatus 1 included in the linkage system of Embodiment 3. The linkage apparatus 1 receives the party telephone information and the state information at the communication part 14 under the control of the control part 10 executing the computer program 101 stored in the memory part 13 (at S601), and updates the state table 12a on the basis of the received state information (namely, records the received state information in the state table 12a) (at S602).

After updating the state information, under the control of the control part 10, the linkage apparatus 1 retrieves, from the process table 12b, records corresponding to a user ID associated with the updated operating state, further retrieves, from the retrieved records, a record having the updated combination of the operating states according with the first state and having party telephone information according with the received party telephone information, and reads a second state recorded in the retrieved record from the process table 12b (at S603). In the operation S603, when a record according both in the party telephone information and the updated operating state is not recorded, a second state recorded in a record according in the updated operating state alone is read. In other words, processing similar to that of Embodiment 1 is executed.

Under the control of the control part 10, the linkage apparatus 1 reads the state information of the second telephone 2 to be linked with the first telephone 2 corresponding to the sender of the state information on the basis of the state table 12a (at S604).

Thereafter, under the control of the control part 10, the linkage apparatus 1 determines whether or not the second state read in the operation S603 accords with the state corresponding to the state information read in the operation S604 (at S605).

When it is determined in the operation S605 that the states accord with each other (namely, YES at S605), the linkage apparatus 1 decides, under the control of the control part 10, a linkage process recorded in the process table 12b in association with the second state read in the operation S603 as the linkage process to be executed by the second telephone 2 having the operating state according with the second state (at S606).

Then, the linkage apparatus 1 issues, under the control of the control part 10, an instruction corresponding to the decided linkage process from the communication part 14 to the second telephone 2 so as to allow the second telephone 2 to execute the decided linkage process (at S607).

When it is determined in the operation S605 that the states do not accord with each other (namely, NO at S605), the linkage necessity determining process is terminated without executing the processing in and after the operation S606.

An instruction executing process performed by the telephone 2 of Embodiment 3 is substantially the same as that of Embodiment 1, and hence the description is herein omitted by referring to the description of Embodiment 1.

Through the state change informing process, the linkage necessity determining process and the instruction executing process exemplarily described above, when there is an incoming call on, for example, a first telephone 2 from a party telephone of "Sato" and a second telephone 2 is busy, the incoming call informing tone superposition is performed. Alternatively, when there is an incoming call on, for example, a first telephone 2 from a party telephone of "Suzuki" and a second telephone 2 is busy, the second telephone 2 informs the incoming call by performing an alert process precedently set, such as output of a call waiting tone or flash of a lamp.

The party telephone information and the state information are transmitted during the execution of the state change informing process of a first telephone in Embodiment 3, which does not limit the invention. Instead, the state information alone may be transmitted, and when the linkage apparatus determines that the party telephone is associated with the first state corresponding to the received state information, the linkage apparatus may request the first telephone to transmit the party telephone information.

Furthermore, although the party telephone information is recorded in association with the first state in this embodiment, the embodiment is not limited to this but the party telephone information may be recorded in association with the second state. In this case, state information related to a call such as the busy state is set as the second state.

Embodiment 4

Figure 13:
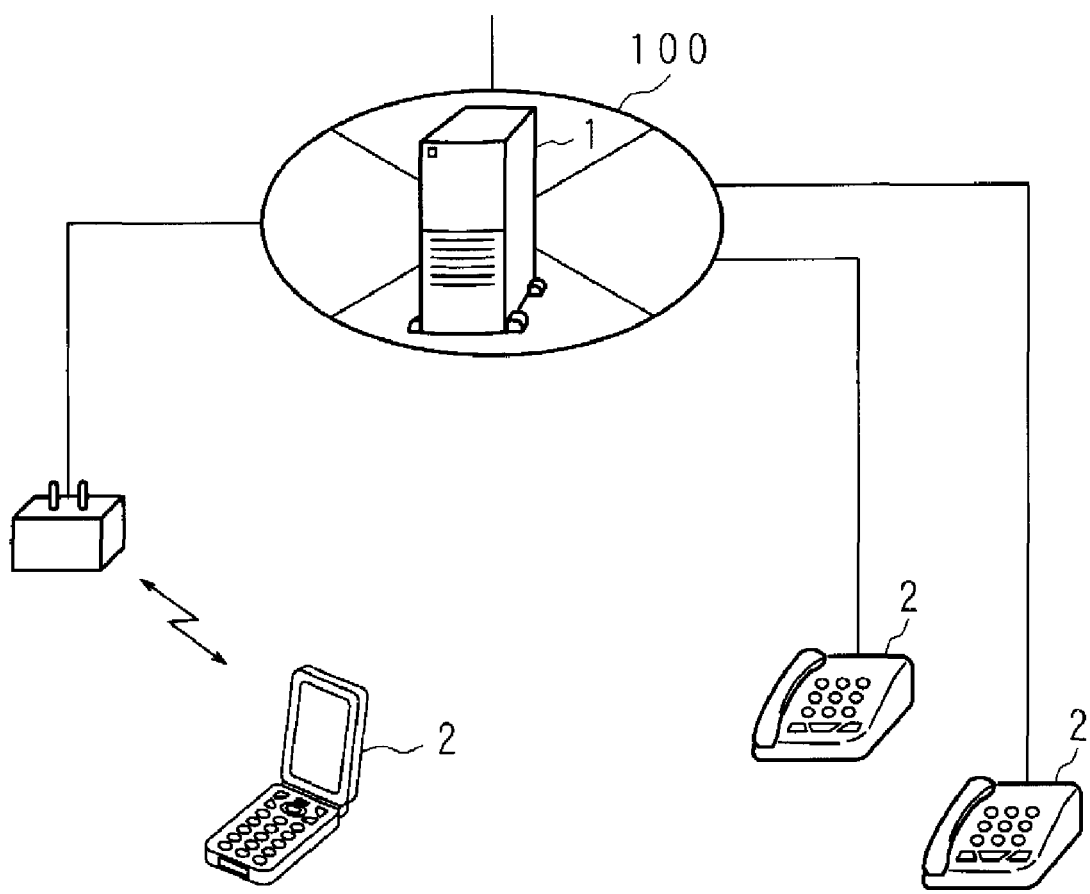
FIG. 13 is a diagram illustrating an exemplary architecture of a linkage system according to Embodiment 4.

In Embodiment 4, the linkage apparatus of Embodiment 1 is provided with a call control part for controlling call connection of a telephone. In FIG. 13, a reference numeral 1 denotes a linkage apparatus using a call control device such as an SIP server, a circuit switching device or an internal PBX device, and the linkage apparatus 1 communicates with telephones 2 such as a cellular phone and a fixed-line telephone through a telephone network 100.

Figure 14:
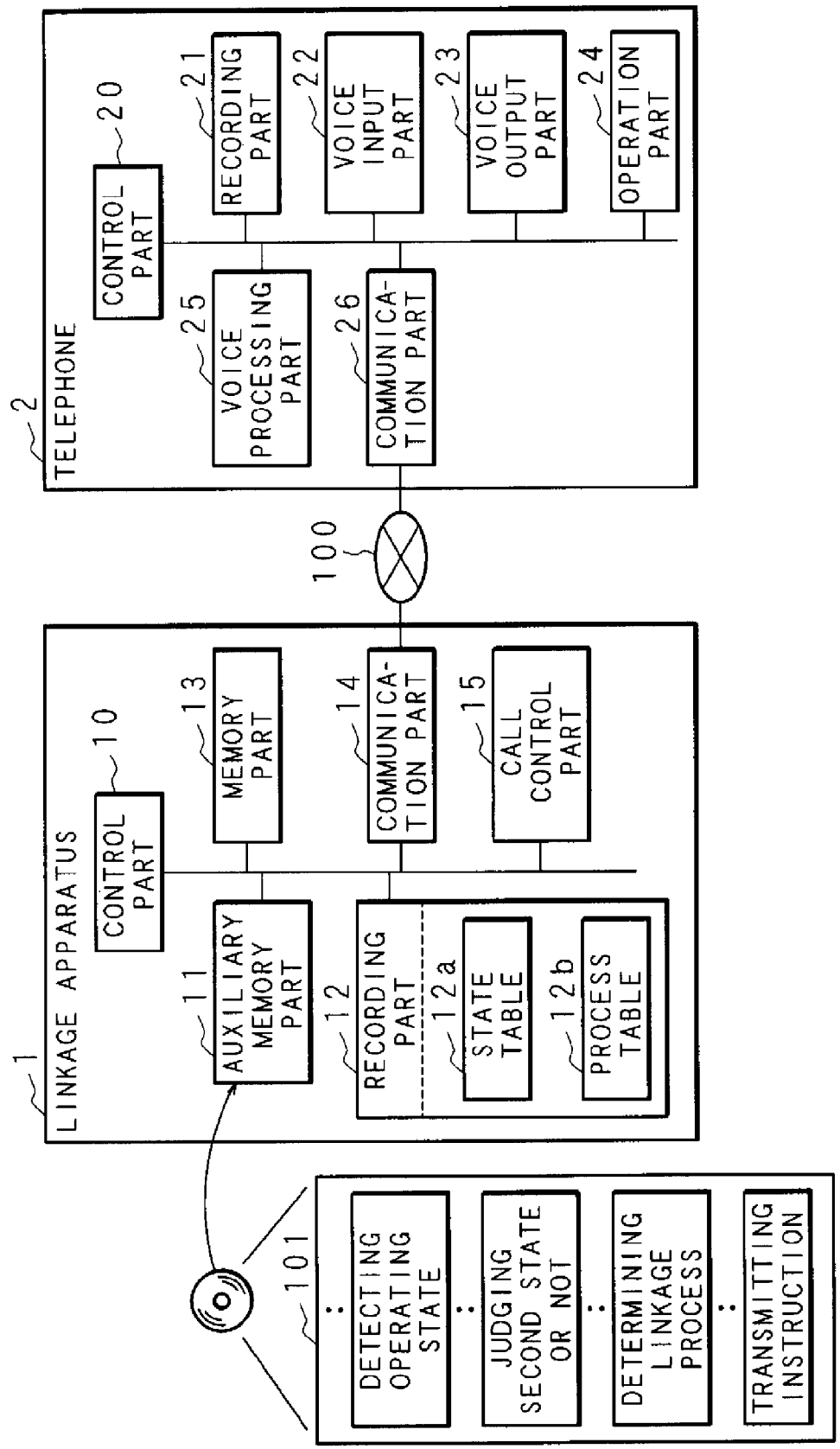
FIG. 14 is a block diagram illustrating exemplary configurations of a linkage apparatus and a telephone included in the linkage system of Embodiment 4.

FIG. 14 is a block diagram illustrating exemplary configurations of the linkage apparatus 1 and each telephone 2 included in the linkage system of Embodiment 4. The linkage apparatus 1 includes a control part 10, an auxiliary memory part 11, a recording part 12, a memory part 13, a communication part 14 to be connected to the telephone network 100, and a call control part 15 that controls a telephone communication call and functions as a call control device such as an SIP server, a circuit switching device or an internal PBX device. Also, the recording part 12 records various kinds of information necessary for processes by using tables such as a state table 12a and a process table 12b.

Each telephone 2 includes a control part 20, a recording part 21, a voice input part 22, a voice output part 23, an operation part 24, a voice processing part 25 and a communication part 26 to be connected to the telephone network 100. Incidentally, the linkage apparatus 1 and each telephone 2 may be connected through a communication method other than the telephone network 100 with communication performed by telephone communication separated from communication performed by another processing, so that the latter communication may be carried out by using a protocol different from that of the telephone communication.

Respective processes performed by the linkage apparatus and each telephone of Embodiment 4 are substantially the same as those of Embodiment 1, and hence the description is herein omitted by referring to the description of Embodiment 1.

Although the linkage apparatus is integrated with the call control device in Embodiment 4, the linkage apparatus may be integrated with a telephone.

Embodiment 5

In Embodiment 5, when a user uses, for example, two telephones of a fixed-line telephone and a cellular phone and a distance between the two telephones exceeds a given condition, such as a case where the user goes out with the cellular phone, a linkage process performed between the two telephones is suppressed because the user cannot deal with the both telephones. Since the exemplary architecture of a linkage system of Embodiment 5 is substantially the same as that of Embodiment 1, the description is herein omitted by referring to the description of Embodiment 1. Also, since the exemplary configurations of a linkage apparatus and each telephone included in the linkage system of Embodiment 5 are substantially the same as those of Embodiment 1, the description is herein omitted by referring to the description of Embodiment 1. It is noted that like reference numerals are used in the following description to refer to like elements used in Embodiment 1.

In Embodiment 5, a telephone 2 of a cellular phone is paired up with, for example, the communication part 14 of the linkage apparatus 1 on the basis of the near field communication standards such as Bluetooth (registered trademark), and the connection therebetween is attained when a distance between the telephone 2 of the cellular phone and the linkage apparatus 1 is not more than a given distance of approximately 10 m and is cancelled when the distance therebetween exceeds the given distance. The linkage apparatus 1 is installed in the vicinity of a telephone 2 of a fixed-line telephone and hence a distance therebetween is not changed. Therefore, when the connection between the telephone 2 of the cellular phone and the linkage apparatus 1 is cancelled, it may be regarded that a distance between the two telephones 2 exceeds a given condition, that is, a distance applicable to communication on the basis of the near field communication standards.

Figure 15:
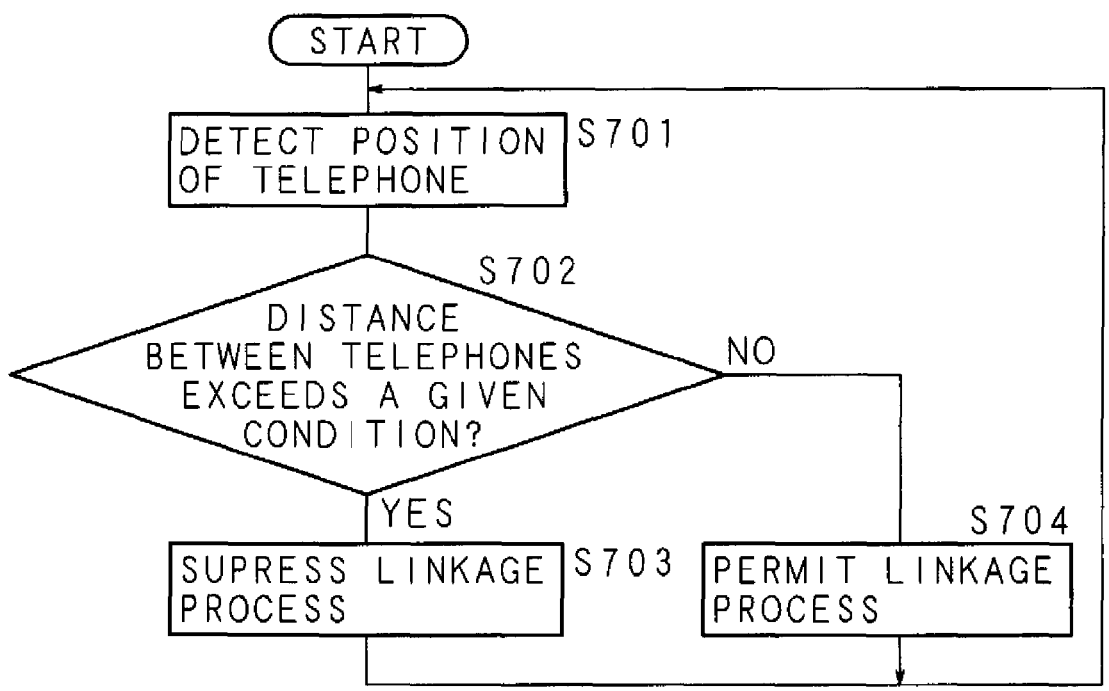
FIG. 15 is an operation chart illustrating an exemplary position linkage process performed by a linkage apparatus according to Embodiment 5.

In FIG. 15, the linkage apparatus 1 detects the position of the telephone 2 of the cellular phone under the control of the control part 10 executing the computer program 101 stored in the memory part 13 (at S701). The operation S701 is processing for detecting the connection on the basis of the near field communication standards.

The linkage apparatus 1 determines under the control of the control part 10 whether or not a distance between the telephones 2 exceeds a given condition on the basis of the detected position (at S702). When the linkage apparatus 1 determines that the connection is not attained through the detection performed in the operation S701, it determines that the distance between the telephones 2 exceeds the given condition.

When it is determined in the operation S702 that the distance between the telephones 2 exceeds the given condition (namely, YES at S702), the linkage apparatus 1 suppresses a linkage process to be performed between the telephones 2 by making a record of the telephone 2 of the cellular phone unreadable from the state table 12a under the control of the control part 10 (at S703), and the operation returns to the operation S701 so as to repeat the processing thereafter. In the operation S703, a record may be made unreadable by deleting the record or by recording information corresponding to read inhibition as the state information. When the record has been already made unreadable, the operation S703 is omitted so as to continue the unreadable state.

When it is determined in the operation S702 that the distance between the telephones 2 does not exceed the given condition (namely, NO at S702), the linkage apparatus 1 allows a linkage process to be performed between the telephones 2 by making a record of the telephone 2 of the cellular phone readable from the state table 12a under the control of the control part 10 (at S704), and the operation returns to the operation S701 so as to repeat the processing thereafter. In the operation S704, a record may be made readable by adding the record or recording the state of the telephone 2 as the state information. When the record has been already made readable, the operation S704 is omitted so as to continue the readable state.

A state change informing process, a linkage necessity determining process and an instruction executing process performed in Embodiment 5 are substantially the same as those of Embodiment 1, and hence the description is herein omitted by referring to the description of Embodiment 1.

Embodiment 6

In Embodiment 6, a fixed-line telephone to be linked with is determined in accordance with the position of a cellular phone. Since the exemplary architecture of a linkage system according to Embodiment 6 is substantially the same as that of Embodiment 1, the description is herein omitted by referring to the description of Embodiment 1. Also, since the exemplary configurations of a linkage apparatus and each telephone included in the linkage system of Embodiment 6 are substantially the same as those of Embodiment 1, the description is herein omitted by referring to the description of Embodiment 1. It is noted that like reference numerals are used in the following description to refer to like elements used in Embodiment 1.

FIG. 16 is a diagram illustrating exemplary recorded contents of a state table 12a included in the linkage apparatus 1 of Embodiment 6. In the state table 12a, data of respective items such as a user ID, a telephone ID, position information, state information and a linkage flag is recorded in association with one another as a record. The user ID, the telephone ID and the state information are substantially the same as those of Embodiment 1. The position information is information corresponding to the position of each telephone 2, and is precedently set with respect to a telephone 2 of a fixed-line telephone and is appropriately updated in accordance with the movement of a telephone 2 with respect to a telephone 2 of a cellular phone. As the position information, any of various information such as the name of a place, and a latitude and a longitude may be used. As the linkage flag, "1" is recorded with respect to a telephone 2 to be linked with, and "0" is recorded with respect to a telephone 2 not to be linked with.

Figure 17:
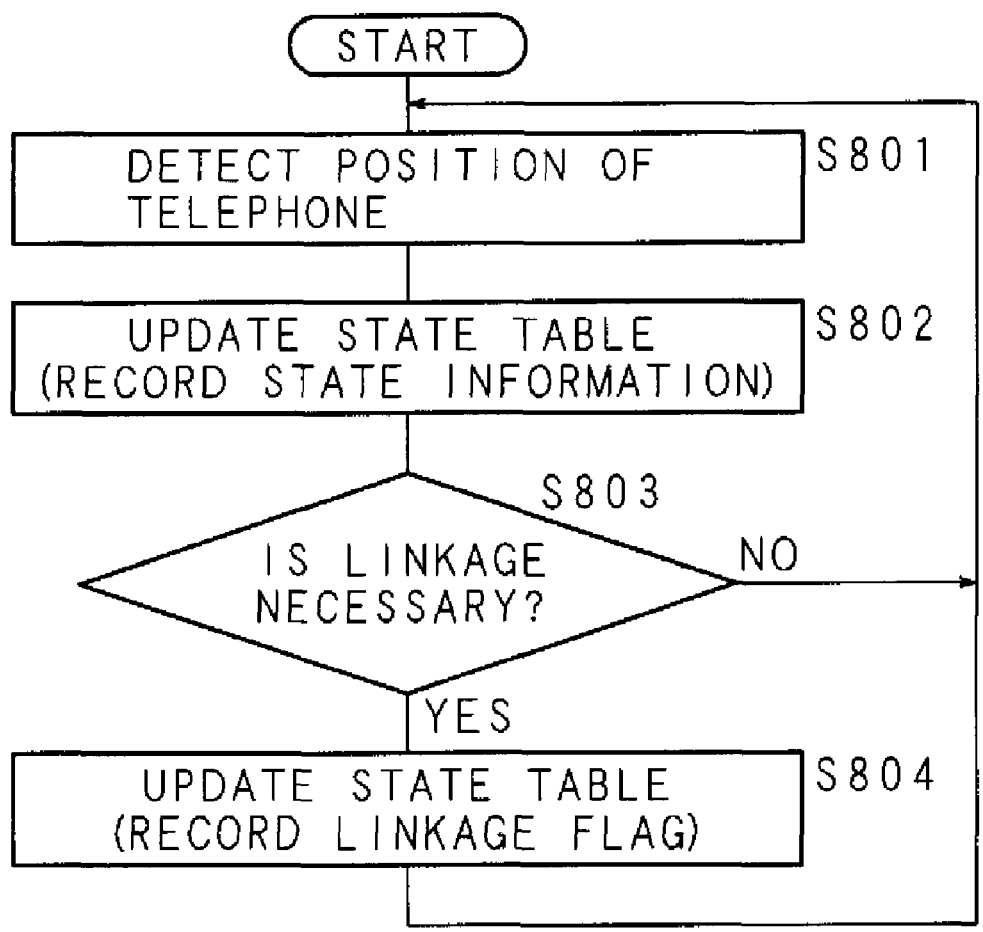
FIG. 17 is an operation chart illustrating an exemplary position linkage process performed by the linkage apparatus of Embodiment 6.

In FIG. 17, the linkage apparatus 1 detects the position of a telephone 2 of a cellular phone under the control of the control part 10 executing the computer program 101 stored in the memory part 13 (at S801), and updates the state table 12a (namely, records state information in the state table 12a) on the basis of position information corresponding to the detected position (at S802). In the operation S801, the linkage apparatus 1 may detect the position of a telephone 2 by, for example, the telephone 2 of the cellular phone detecting its own position by using its function of GPS or the like and transmitting the detected position to the linkage apparatus 1. Alternatively, the linkage apparatus 1 may detect the position of the telephone 2 of the cellular phone by transmitting position information corresponding to the position of the telephone 2 to the linkage apparatus 1 from an access point of the telephone 2. Such a position detecting process may be executed by recording a telephone ID and a linkage apparatus 1 working as a receiver of position information in association with each other in, for example, the call control device and by transmitting a telephone ID detected by the call control device to the corresponding linkage apparatus 1. Furthermore, a plurality of linkage apparatuses 1 may be used so as to set a linkage apparatus 1 working as a receiver of position information in accordance with the detected position or the change of position. Moreover, the position detecting process may be linked with a position check system such as an attendance management system for managing attendance of users.

Under the control of the control part 10, the linkage apparatus 1 determines necessity of linkage on the basis of a positional relationship between a telephone 2 of a cellular phone and a telephone 2 of a fixed-line telephone (at S803), and updates the state table 12a (namely, records a linkage flag in the state table 12a) on the basis of the result of the determination (at S804), and the operation returns to the operation S801 so as to repeat the processing thereafter. When the position information corresponds to the name of a place such as a user's house, the telephone 2 of the cellular phone is linked with a telephone 2 whose position information includes the place of the same name or corresponds to a near position precedently set. Alternatively, when the position information corresponds to a latitude and a longitude, the telephone 2 of the cellular phone is linked with a telephone 2 located within a given distance.

In this manner, in Embodiment 6, the positions of telephones 2 are detected in the same manner as in Embodiment 5, and a linkage process is suppressed when a distance between the telephones 2 exceeds a given condition.

Incidentally, Embodiments 1 through 6 may be practiced independently of one another or may be appropriately combined if necessary.

In the embodiments, when the operating state of the first telephone has changed and the second telephone is in the second state, the second telephone is made to automatically execute a necessary process. Thus, the complicatedness occurring in using a plurality of telephones may be reduced.

In the embodiments, the states of the telephones are managed by using the state table included in the linkage apparatus. Thus, the state of a telephone to be detected may be rapidly detected when it is necessary to detect the state of the telephone.

In the embodiments, a linkage process to be executed in accordance with the state of each telephone may be precedently set in the process table. The states of the telephones are managed, so as to automatically execute a process suitable for the situation. Thus, the operation burden on a user of the telephones may be reduced.

In the embodiments, the linkage apparatus may be integrated with a device such as a call control server computer or an internal PBX.

In the embodiments, it is regarded that there is no opportunity to simultaneously operate a plurality of telephones when a distance therebetween is large. In this case, a linkage process may be suppressed.

In the embodiments, an appropriate process may be performed depending upon a party telephone such as a party having made a call or a party at the other end. For example, a call with a significant customer may be priorly dealt with.

In the embodiments, when there is an incoming call on the first telephone while a user is on the second telephone, the user may automatically check the incoming call with the second telephone. Thus, the operation required for the check may be reduced.

In the embodiments, when a user answers an incoming call on the first telephone while he/she is on the second telephone, the call on the second telephone is automatically put on hold. Thus, the operation required of the user may be reduced.

In the embodiments, the communication may be made with the telephones on the basis of the near field communication standards such as Bluetooth (registered trademark).

In the embodiments, the system is applicable to a radio LAN, an IP telephone or the like.

The linkage apparatus, the linkage system and the computer program of this aspect use a plurality of telephones and a linkage apparatus. The linkage apparatus detects the operating states of the telephones. When the operating state of a first telephone has changed to a first state and the operating state of a second telephone precedently set to be linked with the first telephone is a second state, the linkage apparatus decides a linkage process to be executed by the second telephone. The linkage apparatus issues an instruction corresponding to the decided linkage process to the second telephone. Then, the second telephone executes the process on the basis of the received instruction.

Owing to the aforementioned configuration, for example, the embodiments achieve a good effect of reducing complicatedness of operations to be performed when one user uses a plurality of telephones. For example, in the embodiments, when there is an incoming call on a first telephone while a user is on a second telephone, a tone such as a given electronic tone or voice guidance informing the incoming call is superposed to be output from the second telephone. Thus, a good effect that a user may check an incoming call while on another telephone is achieved. For example, in the embodiments, when a user answers an incoming call on a first telephone while he/she is on a second telephone, the call on the second telephone is automatically put on hold. Thus, a good effect of reducing the operation burden on a user is achieved.

In the embodiments, when the operating state of a telephone, such as the busy state, the incoming state, the calling state, the call holding state or the standby state, has changed, the state information corresponding to the operating state is transmitted from the telephone to the linkage apparatus. In the linkage apparatus, the operating state corresponding to the received state information is recorded in the state table for management.

Owing to the aforementioned configuration, for example, the embodiments achieve a good effect that when it is necessary to detect the state of a telephone, the state of the telephone to be detected may be rapidly detected.

In the embodiments, a state of a telephone and a necessary linkage process are recorded in the process table in association with each other, and a linkage process to be executed by the second telephone is decided by using the process table. Thus, for example, the embodiments achieve a good effect that linkage processes to be executed in accordance with the states of the respective telephones are precedently set in the process table. Also, for example, the states of the telephones are managed so as to automatically execute a suitable process depending upon the situation, and therefore, an effect of reducing the operation burden on a user of the telephones is achieved.

In the embodiments, the linkage apparatus may be integrated with a device for performing near field radio communication, IP communication or call control.

In the embodiments, information corresponding to a party telephone related to a call is recorded in the process table in association with a linkage process. Therefore, the embodiments achieve a good effect that a suitable process may be performed, for example, depending upon a party telephone such as a party having made a call or a party at the other end. Furthermore, a good effect that a call with a significant customer may be priorly dealt with is achieved.

In the embodiments, when a distance between the first telephone and the second telephone exceeds a given condition, a linkage process is suppressed. Thus, the embodiments achieve a good effect that, for example, when a distance between a plurality of telephones is large, a linkage process is suppressed because it is regarded that there is no opportunity to simultaneously operate a plurality of telephones when a distance therebetween is large.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A linkage apparatus for linking a plurality of telephones with one another, comprising:
   a communication part that communicates with the plurality of telephones;
   a detection part that detects operating states of the plurality of telephones;
   a determination part that determines, on the basis of the detected operating states, whether or not the operating state of a first telephone out of the plurality of telephones has changed to a first state from a third state, and when it is determined that the operating state of the first telephone has changed, determines whether or not the operating state of a second telephone precedently set to be linked with the first telephone is a second state;
   a decision part that decides a linkage process that the linkage apparatus makes the second telephone to execute when it is determined that the operating state of the second telephone is the second state;
   a part that issues an instruction corresponding to the decided linkage process to the second telephone; and
   a process table for recording a user ID for specifying a user, a first state, a second state and a linkage process in association with one another, and recording information corresponding to a party telephone of a call with each of the plurality of telephones in association with the first state, wherein
   the determination part makes determination on the basis of the user ID, the first state, the second state and the information corresponding to the party telephone of the call recorded in the process table, and
   the decision part makes decision on the basis of the linkage process recorded in the process table in association with the first state, the second state, and the information corresponding to the party telephone of the call.

2. The linkage apparatus according to claim 1, wherein
   the communication part receives state information corresponding to the operating states,
   the linkage apparatus further comprises a state table for recording the received state information, and
   the detection part detects the operating states of the plurality of telephones on the basis of the state table.

3. The linkage apparatus according to claim 1, further comprising a process table for recording a first state, a second state and a linkage process in association with one another, wherein
   the determination part makes determination on the basis of the a first state and a second state recorded in the process table in association with each other, and
   the decision part makes decision on the basis of a linkage process recorded in the process table in association with the second state.

4. The linkage apparatus according to claim 1, further comprising a call control part that controls call connection of telephone communication of the plurality of telephones.

5. The linkage apparatus according to claim 1, further comprising:
   a part that acquisitions position information of the plurality of telephones; and a part that suppresses a linkage process when a distance between the first telephone and the second telephone exceeds a given condition.

6. A linkage system for linking a plurality of telephones with one another, comprising:
the plurality of telephones; and
a linkage apparatus for linking the plurality of telephones with one another, including:
a communication part that communicates with the plurality of telephones;
a detection part that detects operating states of the plurality of telephones on the basis of communication performed by the communication part;
a determination part that determines, on the basis of the operating states detected by the detection part, whether or not the operating state of a first telephone out of the plurality of telephones has changed to a first state from a third state, and when it is determined that the operating state of the first telephone has changed, determines whether or not the operating state of a second telephone precedently set to be linked with the first telephone is a second state;
a decision part that decides a linkage process that the linkage apparatus makes the second telephone to execute when it is determined by the determination part that the operating state of the second telephone is the second state;
a process table for recording a user ID for specifying a user, a first state, a second state and a linkage process in association with one another, and recording information corresponding to a party telephone of a call with each of the plurality of telephones in association with the first state, wherein
the determination part makes determination on the basis of the user ID, the first state, the second state and the information corresponding to the party telephone of the call recorded in the process table, and
the decision part makes the decision on the basis of the linkage process recorded in the process table in association with the first state, the second state and the information corresponding to the party telephone of the call; and
a part that issues an instruction corresponding to the decided linkage process from the communication part to the second telephone, wherein
the second telephone includes a process execution part executing the linkage process on the basis of the received instruction.

7. The linkage system according to claim 6, wherein
each of the plurality of telephones includes a part transmitting state information corresponding to the operating state thereof to the linkage apparatus when the operating state thereof has changed,
the linkage apparatus further includes a state table for recording the state information received by the communication part, and
the detection part detects the operating states of the plurality of telephones on the basis of the state table.

8. The linkage system according to claim 7, wherein
the process table records a first state corresponding to an incoming state, a second state corresponding to a busy state and a linkage process of outputting a given tone in association with one another, and
the process execution part outputs the given tone superposed on a conversation tone.

9. The linkage system according to claim 7, wherein
the process table records a first state corresponding to a state for answering an incoming call, a second state corresponding to a busy state and a linkage process of holding a call in association with one another.

10. The linkage system according to claim 6, wherein
the process table records a first state corresponding to an incoming state, a second state corresponding to a busy state and a linkage process of outputting a given tone in association with one another, and
the process execution part outputs the given tone superposed on a conversation tone.

11. The linkage system according to claim 6, wherein
the process table records a first state corresponding to a state for answering an incoming call, a second state corresponding to a busy state and a linkage process of holding a call in association with one another.

12. The linkage system according to claim 6, wherein
the communication part performs communication by a communication method on the basis of near field communication standards.

13. The linkage system according to claim 6, wherein
the communication part performs communication through an Internet Protocol network.

14. The linkage system according to claim 6, wherein
the linkage apparatus further includes a call control part controlling call connection of telephone communication of the plurality of telephones.

15. The linkage system according to claim 6, wherein
the linkage apparatus further includes:
a part that detects positions of the plurality of telephones; and
a part that suppresses a linkage process when a distance between the first telephone and the second telephone exceeds a given condition.

16. A computer-readable recording medium storing a computer-executable program for causing a computer, which includes a part communicating with a plurality of telephones, to link the plurality of telephones with one another, the program causing the computer to execute:
detecting operating states of the plurality of telephones;
determining, on the basis of the detected operating states, whether or not the operating state of a first telephone out of the plurality of telephones has changed to a first state from a third state, and when it is determined that the operating state of the first telephone has changed, determining whether or not the operating state of a second telephone precedently set to be linked with the first telephone is a second state;
deciding a linkage process that the computer makes the second telephone execute when the operating state of the second telephone is the second state;
recording on a process table a user ID for specifying a user, a first state, a second state and a linkage process in association with one another, and recording information corresponding to a party telephone of a call with each of the plurality of telephones in association with the first state;
determining on the basis of the user ID, the first state, the second state and the information corresponding to the party telephone of the call recorded in the process table;
deciding on the basis of the linkage process recorded in the process table in association with the first state, the second state, and the information corresponding to the party telephone of the call; and
issuing an instruction corresponding to the decided linkage process to the second telephone.

17. A linkage apparatus for linking a plurality of telephones with one another, comprising:
- communication means for communicating with the plurality of telephones;
- detection means for detecting operating states of the plurality of telephones;
- determination means for determining, on the basis of the detected operating states, whether or not the operating state of a first telephone out of the plurality of telephones has changed to a first state from a third state, and when it is determined that the operating state of the first telephone has changed, determining whether or not the operating state of a second telephone precedently set to be linked with the first telephone is a second state;
- decision means for deciding a linkage process that the linkage apparatus makes the second telephone to execute when it is determined that the operating state of the second telephone is the second state; and
- a process table for recording a user ID for specifying a user, a first state, a second state and a linkage process in association with one another, and recording information corresponding to a party telephone of a call with each of the plurality of telephones in association with the first state; and
- means for issuing an instruction corresponding to the decided linkage process to the second telephone;
- wherein the determination means makes determination on the basis of the user ID, the first state, the second state and the information corresponding to the party telephone of the call recorded in the process table, and
- the decision part makes decision on the basis of the linkage process recorded in the process table in association with the first state, the second state, and the information corresponding to the party telephone of the call.

* * * * *